(12) United States Patent
Birrell et al.

(10) Patent No.: US 8,177,610 B2
(45) Date of Patent: May 15, 2012

(54) COMBINATION RESIDUE SPREADER AND COLLECTOR FOR SINGLE PASS HARVESTING SYSTEMS

(75) Inventors: Stuart J. Birrell, Ames, IA (US); Benjamin J. Schlesser, Davenport, IA (US); Mark D. Dilts, Sioux Falls, SD (US)

(73) Assignee: Iowa State University Research Foundation, Inc., Ames, IA (US)

( * ) Notice: Subject to any disclaimer, the term of this patent is extended or adjusted under 35 U.S.C. 154(b) by 414 days.

(21) Appl. No.: 12/062,846

(22) Filed: Apr. 4, 2008

(65) Prior Publication Data

US 2008/0248843 A1 Oct. 9, 2008

Related U.S. Application Data

(60) Provisional application No. 60/910,250, filed on Apr. 5, 2007, provisional application No. 60/998,984, filed on Oct. 15, 2007.

(51) Int. Cl.
*A01F 12/30* (2006.01)
(52) U.S. Cl. ........................................ 460/111; 460/112
(58) Field of Classification Search .................. 460/111, 460/112
See application file for complete search history.

(56) References Cited

U.S. PATENT DOCUMENTS

| | | | |
|---|---|---|---|
| 602,659 A | 4/1898 | Gray | |
| 786,238 A | 3/1905 | Stone | |
| 1,195,320 A | 8/1916 | Zickefoose | |
| 1,628,461 A | 5/1927 | Grossman | |
| 2,500,040 A | 3/1950 | McKahin | |
| 2,524,603 A | 10/1950 | Rosenthal | |
| 2,708,582 A | 5/1955 | Adams | |
| 2,974,465 A | 3/1961 | Snow | |
| 3,103,241 A * | 9/1963 | Weigel | 241/55 |
| 3,389,732 A | 6/1968 | Waldrop | |
| 4,061,284 A | 12/1977 | Raisbeck | |
| 4,591,102 A | 5/1986 | Clarke | |
| 4,600,019 A | 7/1986 | McBroom | |
| 5,482,508 A | 1/1996 | Redekop | |

(Continued)

FOREIGN PATENT DOCUMENTS

EP 1261250 B1 9/2004

OTHER PUBLICATIONS

Shinners et al., "Single-Pass, Split-Stream Harvest of Corn Grain and Stover", Transactions of the ASABE, vol. 50 (2):355-363 (2007).

(Continued)

*Primary Examiner* — Thomas B Will
*Assistant Examiner* — Mai Nguyen
(74) *Attorney, Agent, or Firm* — McKee, Voorhees & Sease, P.L.C.

(57) ABSTRACT

A crop residue harvesting system for a harvesting machine is provided. The crop residue harvesting system includes a blower and a transition member having a first position and a second position. In a first position the transition member directs at least a portion of the crop residue to the blower for harvesting of the crop residue. In a second position the transition member allows for spreading at least a portion of the crop residue. A lever or actuator may be operatively connected to the transition member for selecting between the first position and the second position or selecting an intermediate position to control the proportions of the crop residue harvested and the crop residue spread.

39 Claims, 9 Drawing Sheets

U.S. PATENT DOCUMENTS

| | | | |
|---|---|---|---|
| 5,928,080 A | 7/1999 | Jakobi | |
| 6,120,373 A | 9/2000 | Schrattenecker | |
| 6,126,098 A | 10/2000 | Schrattenecker | |
| 6,251,009 B1 | 6/2001 | Grywacheski | |
| 6,354,938 B1 | 3/2002 | Schrattenecker | |
| 6,358,141 B1 | 3/2002 | Stukenholtz | |
| 6,539,693 B2 * | 4/2003 | Krone et al. | 56/16.6 |
| 6,685,558 B2 | 2/2004 | Niermann | |
| 7,044,853 B2 | 5/2006 | Weichholdt | |
| 2004/0261389 A1 | 12/2004 | Shields | |
| 2006/0046800 A1 | 3/2006 | Kaltenheuser | |
| 2006/0183519 A1 | 8/2006 | Benes | |
| 2006/0246966 A1 | 11/2006 | Smith | |

OTHER PUBLICATIONS

Shinners et al., "Single-Pass, Split-Stream of Corn Grain and Stover", An ASABE Meeting Presentation, Portland, Oregon, Paper No. 061015 (2006).

International Search Report, Iowa State University Research Foundation, Inc., PCT/U208/59416, Apr. 4, 2008, 2 pages.

* cited by examiner

COMBINATION RESIDUE SPREADER AND COLLECTOR FOR SINGLE PASS HARVESTING SYSTEMS

CROSS-REFERENCE TO RELATED APPLICATIONS

This application claims priority under 35 U.S.C. §119 to provisional application Ser. No. 60/910,250 filed Apr. 5, 2007 and Ser. No. 60/998,984 filed Oct. 15, 2007, both of which are herein incorporated by reference in their entireties.

GRANT REFERENCE

This invention was made with government support under Grant No. 68-3A75-4-137 awarded by USDA/NRCS and DOE. The Government has certain rights in this invention.

BACKGROUND OF THE INVENTION

Agricultural combine harvesters are typically designed to cut off crops at ground-level, separate non-grain plant matter from the crop portions of the plant, save the crop portions to a holding tank or reservoir, and discard the non-grain plant matter at the rear of the vehicle.

Often, the non-grain plant matter, includes, without limitation, stems, cobs, stalks, leaves, and branches. The term crop residue may be used to describe this generally non-grain plant material. This term is indicative of the historical relative value of grain and non-grain material. The crop residue is chopped at the rear of the combine harvester and distributed over the ground where it is broken down by microbes in the soil and provides fertilizer for the next growing season's crops.

In recent years, however, there has been a growing movement to recover this non-grain plant matter and to use it for secondary processes, such as for a biomass material for ethanol production. Thus, this non-grain plant matter has value beyond its traditional usage. The collection of the material can either occur simultaneously with grain harvest in a single pass operation, or collected after grain harvest, in a multiple pass operation. In a single pass operation, the non-grain plant material can be collected after it is chopped at the rear of the vehicle and is directed into a "stover" cart or similar wheeled container that is towed behind the combine harvester to receive the non-grain plant matter, while the grain is collected in the combine grain tank. In a multi-pass operation, the non-grain material can be left on the field during grain harvest and collected during subsequent field operations, using a baler, forage harvester or similar machinery What is needed, therefore, is an apparatus for varying the amount of chopped non-grain plant material that is distributed over the ground while the vehicle is underway. What is also needed is a way of automatically varying the amount of chopped non-grain plant material that is deposited on the ground based upon soil parameters, crop parameters, terrain parameters or other environmental or regulatory factors.

It is an object of this invention to provide such an apparatus.

BRIEF SUMMARY OF THE INVENTION

According to one aspect of the present invention, a crop residue harvesting system for a harvesting machine having a crop residue chopper is provided. The crop residue harvesting system includes an accelerator to assist in conveying crop residue and a transition member, the transition member having a first position and a second position. In a first position the transition member directs at least a portion of the crop residue to the accelerator for harvesting of the crop residue. In a second position the transition member allows for spreading at least a portion of the crop residue.

According to another aspect of the present invention, a harvesting machine is provided. The harvesting machine includes a self-propelled vehicle adapted for separating grain from crop residue, a residue chopper operatively connected to the vehicle and adapted for receiving the crop residue and chopping the crop residue to form chopped crop residue, an accelerator for conveying the chopped crop residue, and a transition member having a first position and a second position operatively connected between the residue chopper and the accelerator. In a first position the transition member directs at least a portion of the chopped crop residue to the accelerator for harvesting of the chopped crop residue. In a second position the transition member allows for spreading at least a portion of the chopped crop residue.

According to another aspect of the present invention, a method for harvesting a crop using a harvesting machine is provided. The method includes selecting a setting on the harvesting machine to control relative proportions of crop residue spreading and crop residue harvesting, separating grain from crop residue using the harvesting machine, collecting the grain using the harvesting machine, and chopping the crop residue using a chopper of the harvesting machine.

According to another aspect of the present invention, a harvesting machine is adapted for selectively collecting and spreading crop residue. The harvesting machine includes a vehicle adapted for separating grain from crop residue and a transition member having at least a first position and a second position. In a first position the transition member directs at least a portion of crop residue for collection. In a second position the transition member allows for spreading at least a portion of the chopped crop residue. There is at least one actuator operatively connected to the transition member for adjusting position of the transition member.

DETAILED DESCRIPTION OF THE PREFERRED EMBODIMENT

The device combines two separate functions and can be switched to perform either of the functions at a given time.

The transition/residue spreader can be set to either funnel crop residue from the outlet of the residue chopper at the back of a combine harvester to a blower for residue harvest purposes, or it can be set to deflect the residue away from the blower and uniformly distribute it on the ground. The transition component funnels the crop residue from the chopper to the blower being used for stover collection purposes. Thus, the flexibility of performing either operation is provided with minimal effort required to switch between the two. Moreover, the present invention provides for controlling relative amounts of crop residue which is collected and spread and this control may be provided electronically either by an operator or based on geographic position within a field or other factors such as, but not limited to, soil parameters such as soil moisture, soil pH, soil clay content, soil sand content; terrain parameters such as inclination of the field; and plant parameters such as the moisture content of the non-grain plant material, quality of material and the volume of the non-grain plant material, and other environmental or regulatory parameters such as residue removal rates for conservation compliance.

Figure 1:
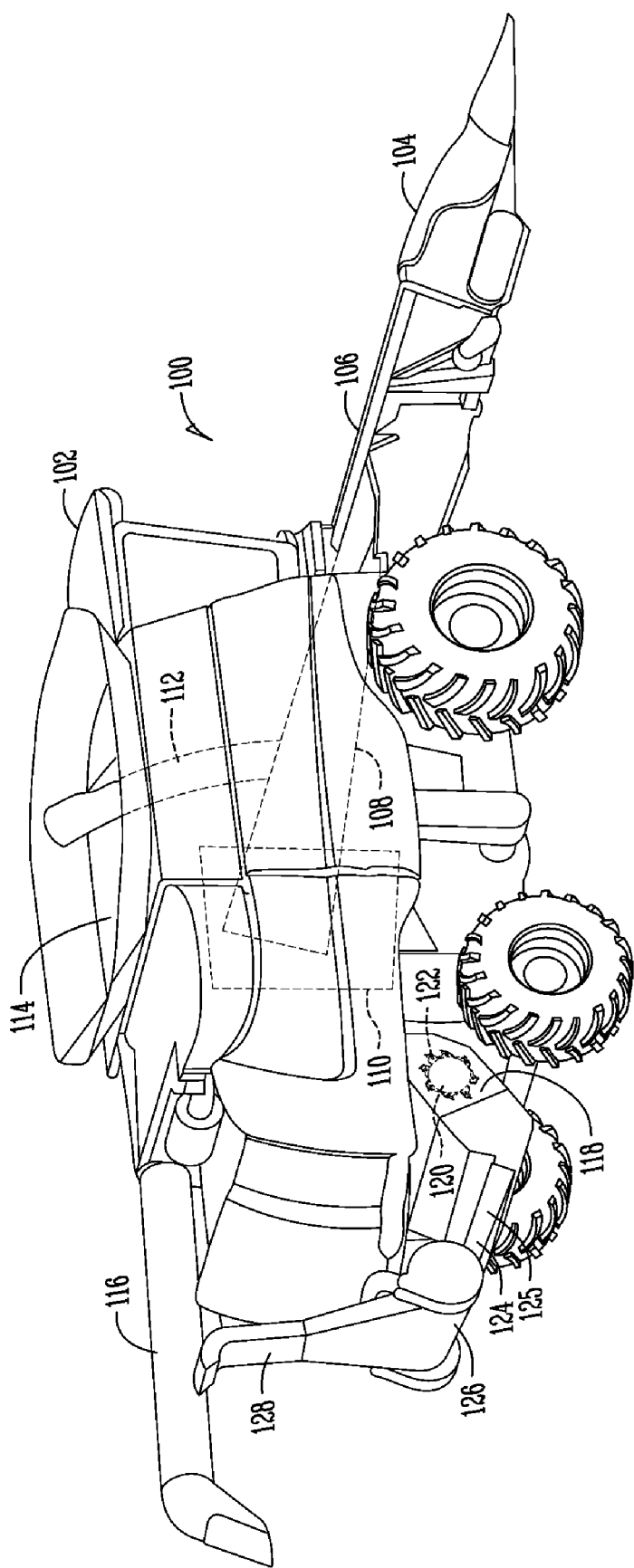
FIG. 1 is a perspective view of one embodiment of a harvesting machine in a crop residue collecting position.

FIG. 1 is a perspective view of one embodiment of a harvesting machine in the form of a combine harvester 100. The combine harvester 100 includes a self-propelled combine vehicle 102, to which a harvesting head 104 is attached. The harvesting head 104 is supported on a feeder house 106 that is pivotally coupled to and disposed at the front of the vehicle 102. A threshing system 108 is disposed within the vehicle 102. The threshing system 108 feeds the threshed crop material to a cleaning and separating system 110, which is also disposed within the vehicle 102. Grain that is separated during cleaning and separating stages of the cleaning and separating system 110, falls to the bottom of the combine harvester 100 and is conveyed by a grain elevator 112 to a grain tank 114 where it is held for future unloading such as to a grain cart (not shown) via unloading conveyor 116.

Non-grain plant material, such as stems, stalks, leaves, branches, and cobs, is conveyed from the cleaning and separating system 110 to a chopper 118 disposed at the rear of the vehicle 102. Chopper 118 may include a rotating shaft 120 to which a plurality of knife blades 122 are attached. Such blades preferably chop the non-grain plant material into lengths of about 1-2 inches or less.

Figure 2:
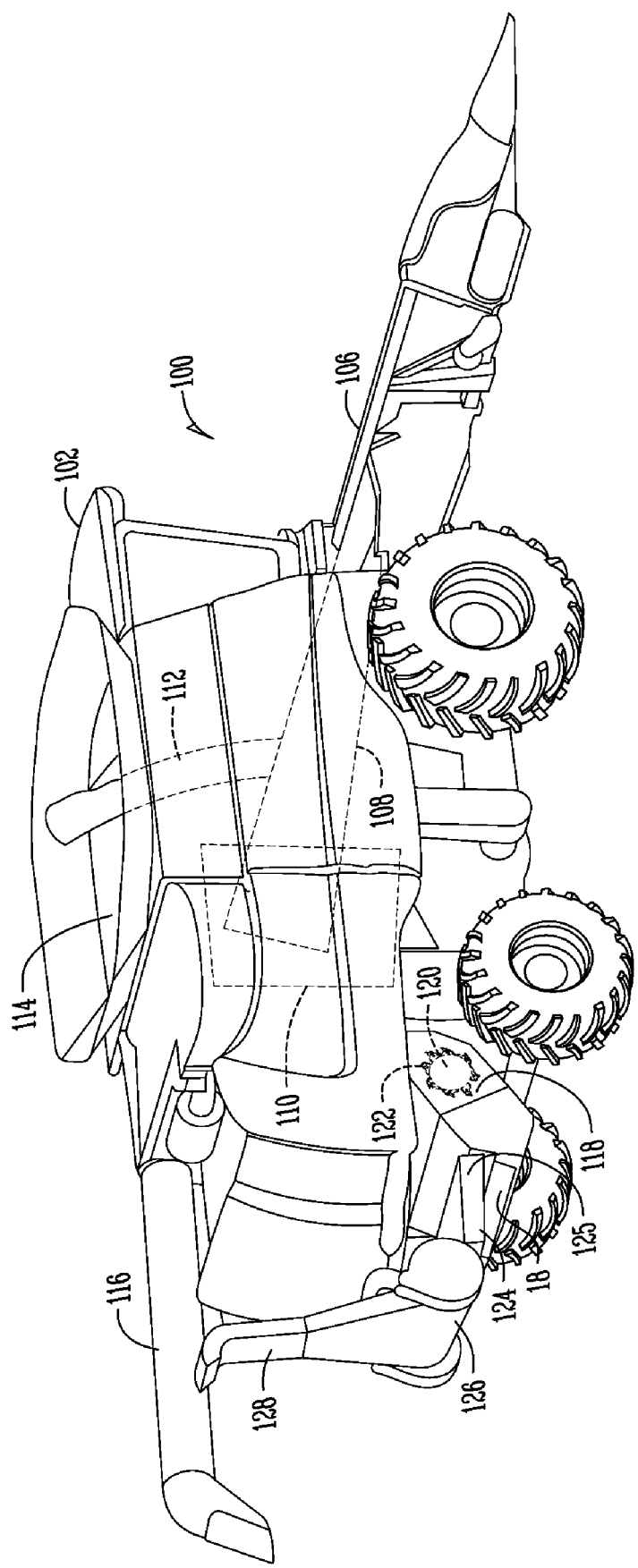
FIG. 2 is a perspective view of the harvesting machine in a position such that crop residue is spread on the ground.

The chopper 118 imparts considerable momentum to the chopped non-grain plant material, causing it to exit the chopper 118 into a transition member 124. A transition member is a structure located anywhere between the chopper and the accelerator for selectively directing flow of crop residue between crop residue collecting and crop residue spreading. As shown in FIG. 1, the transition member 124 includes a conduit 125 connected to the exit of chopper 118. The conduit 125 extends between the chopper 118 and the accelerator 126 which may be disposed approximately 2 feet away from chopper 118. The accelerator 126, includes a rotor that spins at high speed and conducts the chopped non-grain plant material up an exit conduit 128 which is coupled to the outlet of the accelerator 126. The exit conduit 128, in turn, directs the chopped non-grain plant material into a grain cart or other storage or transport container. FIG. 2 illustrates the combine harvester 100 of FIG. 1 except the transition member 124 is in a different relative position to affect the flow of crop residue from the chopper. As shown in FIG. 2, the inlet end of the transition member is raised above the outlet from the chopper to direct the path of crop residue so that crop residue is spread on the ground and not directed towards the accelerator 126.

Figure 3:
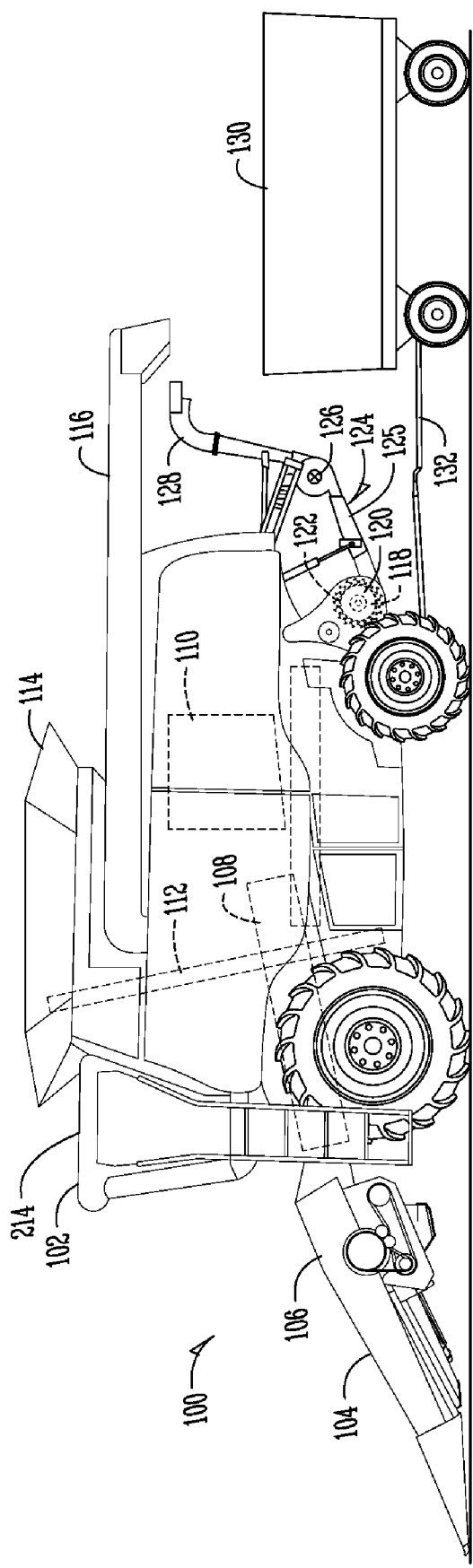
FIG. 3 is a side view of the harvesting machine for spreading and collecting crop residue in a single pass.

FIG. 3 illustrates the combine harvester 100 with a stover cart 130. The grain cart 130 may be drawn to the field by the combine 100 to which it is attached by a cart tongue 132. Alternatively, the cart 130 may be drawn to the field by a tractor or other vehicle. In this manner, the combine harvester 100 may make a single pass of the field to collect grain in the grain tank 114 and crop residue in the cart 130. In addition, because of the transition member 124 which may include a conduit 125, some or all of the crop residue may be spread with the remaining portion collected through the control of the relative position of the transition member with respect to the chopper and/or the accelerator 126.

Figure 4:
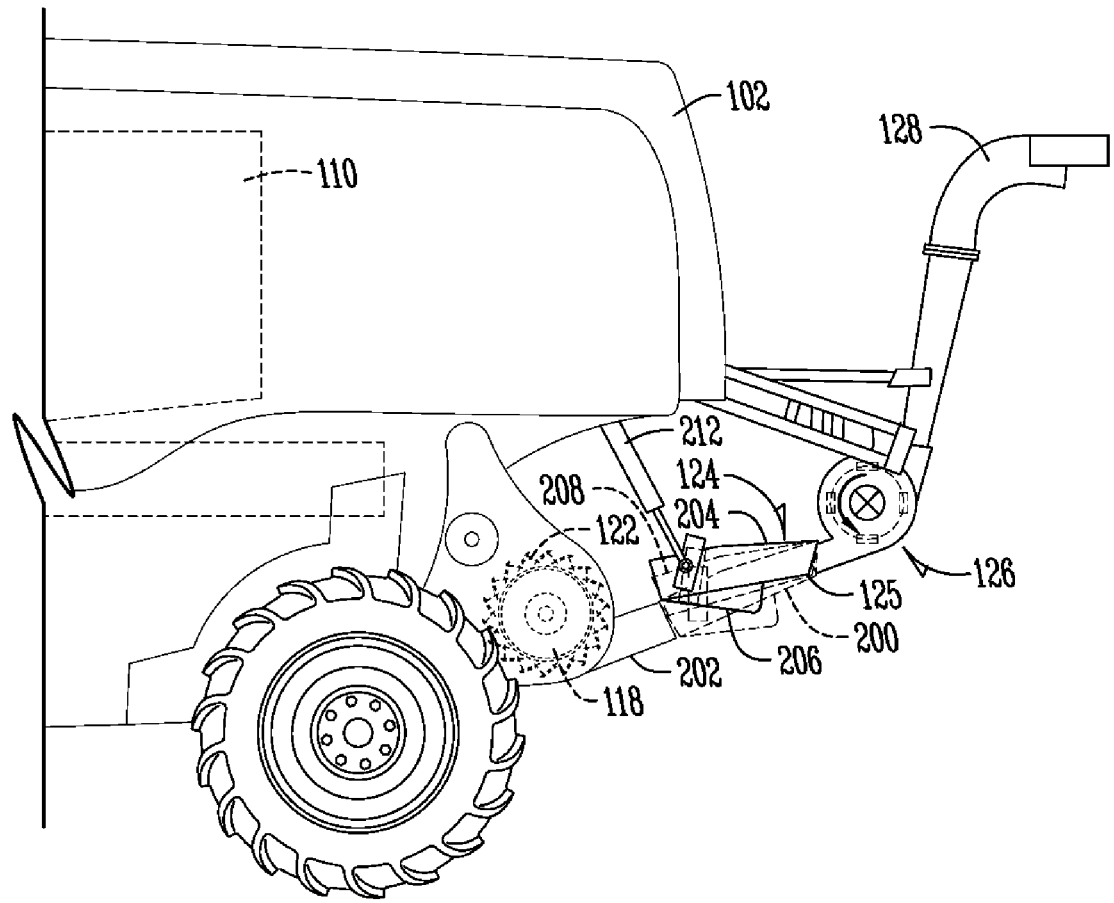
FIG. 4 illustrates the transition member for selecting between spreading and collecting in greater detail.

Referring now to FIG. 4, a detailed illustration is provided showing the chopper 118, transition member 124 including a conduit 125, accelerator 126, and exit conduit 128 in partial cutaway. In FIG. 4, the conduit 125 is illustrated in three different positions. The conduit 125 of the transition member 124 functions to direct the flow leaving chopper 118 proportionally into either (or both) of two directions: to exit conduit 128 and thence into wagon 130.

A first position 200 is illustrated in FIG. 4 in which the conduit covers the entire outlet 202 of the chopper 118, directing all chopped non-grain plant material exiting the chopper into the conduit 124 and thence into the accelerator 126.

A second position 204 is also illustrated in FIG. 4 in which the conduit 124 partially covers the outlet 202 of the chopper 118 conducting a portion of the chopped non-grain plant material into the conduit 124 and directing the remaining portion of the chopped non-grain plant material against flow directors 206 that are coupled to the bottom of the conduit 124 and are disposed to direct chopped non-grain plant material into a wide swath that will cover the ground behind the combine harvester 100, extending substantially all the way from the left side of the combine harvester 100 to the right side of the combine harvester 100. In an alternative arrangement, flow directors 206 are disposed to direct chopped non-grain plant material into a wide swath that will cover the ground behind combine harvester 100, extending substantially all the way from the left side of harvesting head 104 to the right side of harvesting head 104.

A third position 208 of conduit 124 is further illustrated in FIG. 2 in which all of the non-grain chopped plant material leaving chopper 118 is directed into flow directors 206. In this manner, all the chopped plant material leaving chopper 118 is distributed across the ground. By extension, none of the chopped non-grain plant material is directed into the open end of conduit 125.

While only three positions are illustrated in FIG. 4, conduit 125 can take any position between position 200 and position 208. Thus, different relative amounts of crop residue may be spread or harvested.

Figure 5A:
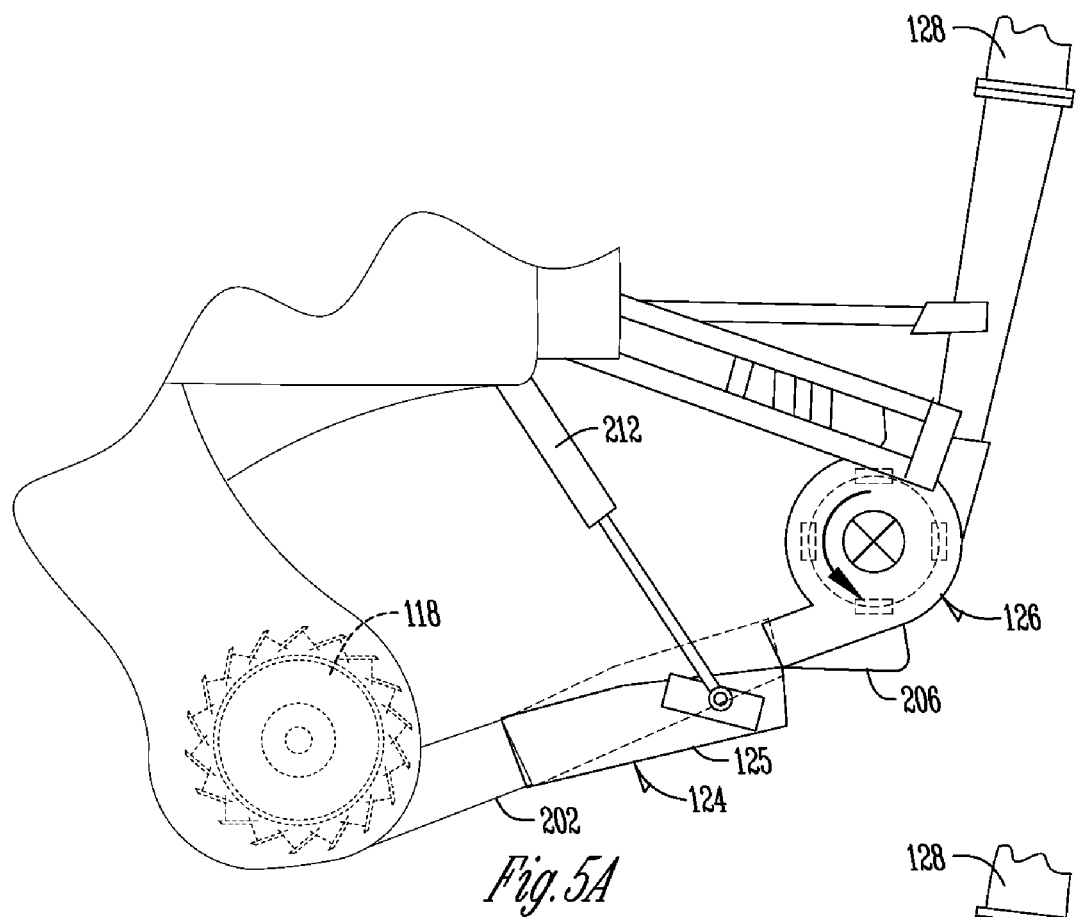
FIG. 5A illustrates another arrangement for the transition member.

In an alternative arrangement, shown in FIG. 5A, the transition member 124 includes a conduit 125. The inlet end of the conduit 125 is pivotally coupled to the outlet 202 of chopper 118. The outlet end of conduit 125 is movable up and down to the same range of positions shown in FIG. 4 with respect to the inlet of accelerator 126. In this embodiment, flow directors 206 are disposed adjacent to accelerator 126, and are not disposed on conduit 125.

Figure 5B:
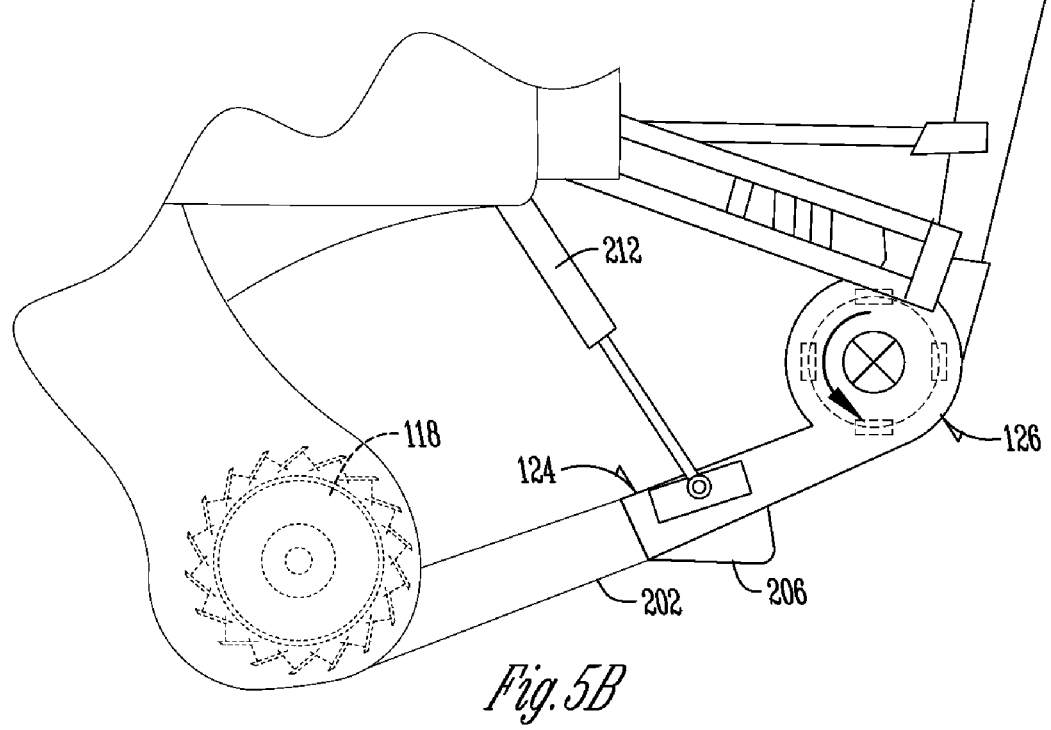
FIG. 5B illustrates another arrangement for the transition member.

In another alternative arrangement, shown in FIG. 5B, the accelerator 126 is movable with respect to chopper 118 to a range of positions in which 100% of the chopped non-grain plant material is directed into accelerator 126 and 100% of the chopped non-grain plant material is directed into flow director 206 and all positions in between as in the previous examples. In this arrangement, the transition member 124 includes the inlet conduit to the accelerator 126.

Figure 5C:
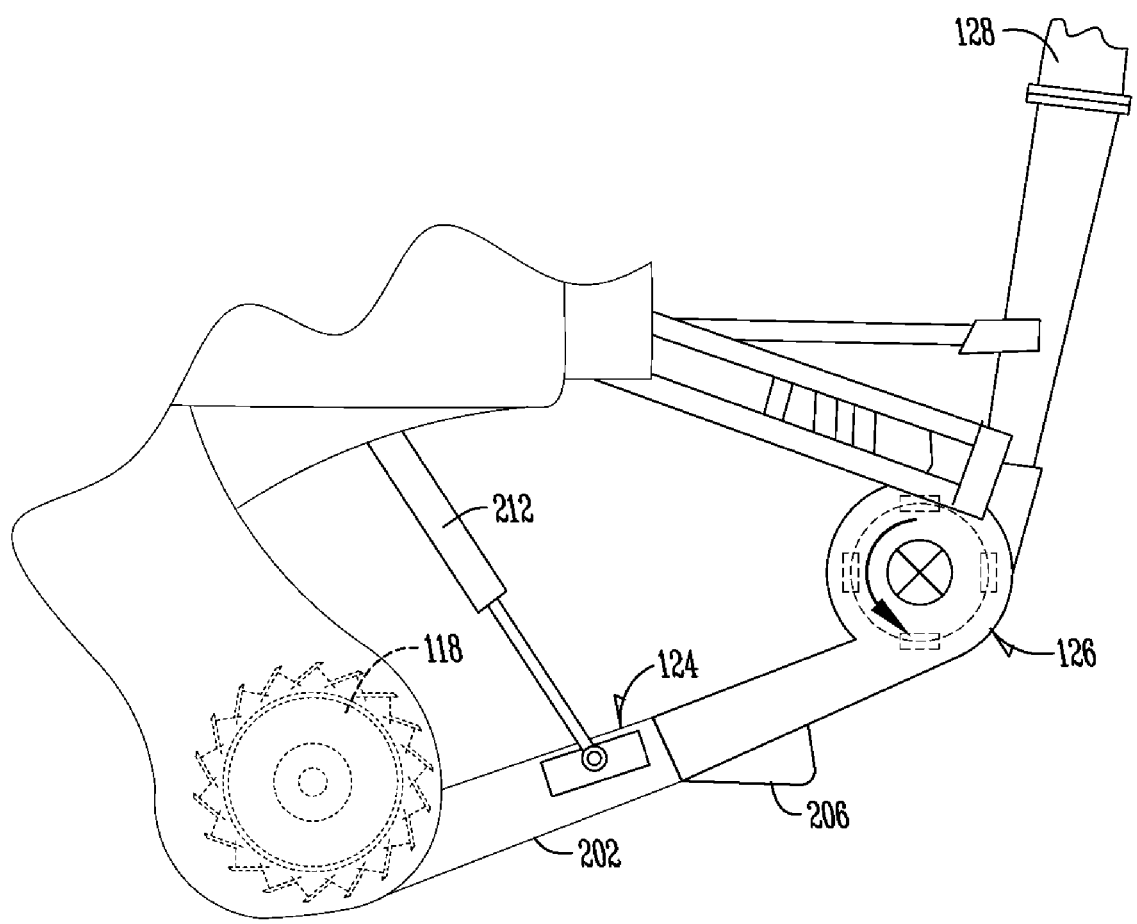
FIG. 5C illustrates yet another arrangement for the transition member.

In a further alternative arrangement shown in FIG. 5C, a portion 210 of the floor of conduit 124 is pivotable up-anddown through a similar range of positions to direct 100% of the chopped non-grain plant material into accelerator 126 or 100% of the chopped non-grain plant material into flow director 206 and all positions in between as in the previous examples. In this arrangement, the transition member 124 includes the outlet conduit from the chopper 128.

Other alternative arrangements for the transition member are contemplated. For example, the transition member may be placed after the accelerator. Thus, the transition member need not be positioned between the chopper and the accelerator as shown.

In each of the foregoing examples, an actuator 212 is provided to move the movable complement to its range of positions in order to provide for the direction of flow either through accelerator 126 or over the ground. Actuator 212 as shown here is a hydraulic cylinder having one end connected to a rigid support and a second end connected to the element that is moved to change the direction of flow of chopped non-grain plant material. Thus, in the arrangements shown, the actuator 212 is operatively connected to the transition member 124 to change paths of crop residue from the chopper 118.

Actuator 212 need not be a hydraulic cylinder, however. It may be a linear actuator that is hydraulically, pneumatically, or electrically driven. It may be rotary actuator that is hydraulically, pneumatically, or electrically driven. Other types of actuators may be used as appropriate in a particular application or environment.

In one arrangement, the operator has a control in the operator's cab 214 (FIG. 3) that is operable while the vehicle is underway to reposition the actuator and redirect flow either through accelerator 126 or over the ground. In another arrangement, one or more sensors are provided that sense soil conditions, terrain conditions, or crop conditions and automatically reposition the actuator according to an algorithm stored in an electronic memory of an intelligent control such as a microcontroller, processor, or other type of intelligent control. In another arrangement, a map is provided to, either alone, or in combination with the above identified sensors, be used to automatically reposition the actuator 212 according to an algorithm stored in an electronic memory of a microcontroller.

Figure 6:
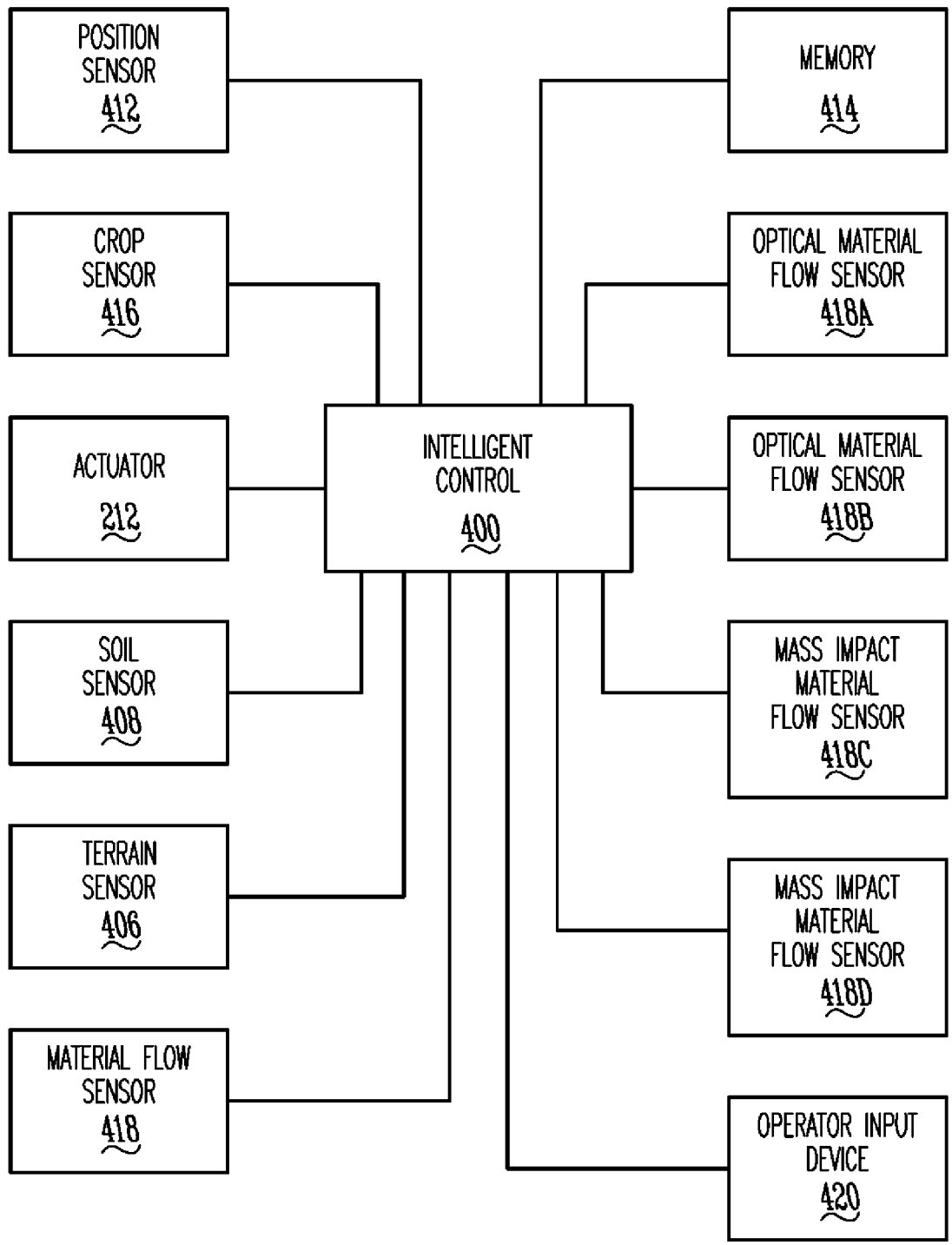
FIG. 6 is a block diagram illustrating electronic control of the spreading and collecting of crop residue.

FIG. 6 illustrates several of these arrangements in schematic diagram form. Referring now to FIG. 6, an intelligent control 400 is electrically connected to an actuator 212 which may control a hydraulic valve to change the relative position of the transition member. In this way, the intelligent control 400 controls the relative amounts of crop residue spread and collected. The intelligent control can be based on instructions within memory 414, such as instructions formed based on a map. The intelligent control may also be based on signals from various sensors as well as operator input devices.

Intelligent control 400 is coupled to the terrain sensor 406 which is responsive to the slope of the ground over which combine harvester 100 is traveling. As the slope changes, terrain sensor 406 sends a signal indicative of the slope of the ground to the intelligent control 400, which receives the signal and adjusts the position of actuator 212 accordingly. In particular, as terrain sensor 406 senses the changing slope, the intelligent control 400 is configured to adjust actuator 212 to increase the amount of chopped non-grain plant material that is distributed over the ground, thereby providing heavier ground cover on portions of the field with greater slope. This additional ground cover retains rain and slows run off thereby reducing soil erosion.

Intelligent control 400 is also coupled to soil sensor 408 which senses the soil surface residue. As surface residue decreases, the intelligent control 400 is configured to adjust actuator 212 to increase the amount of chopped non-grain plant material that is distributed over the ground. In this case, it is assumed that the objective is to maintain place surface plant residue above a certain threshold for conservation management compliance.

The intelligent control 400 is also coupled to soil sensor 410 which senses the organic matter content of the soil. As organic matter increases, the intelligent control 400 is configured to decrease the amount of chopped non-grain plant material that is distributed over the ground. The assumption is that if soil organic matter levels are high greater material removal rates are possible without effecting soil quality. This will allow higher removal rates and increased economic returns.

The intelligent control 400 is also coupled to an electronic position sensor 412 such as a GPS receiver, LORAN receiver, or other ground, satellite-based, or dead reckoning position sensor. The intelligent control 400 is electrically connected to a memory 414 which may be internal and/or external and which stores map data of the field through which combine harvester 100 is traveling and harvesting crop. For each possible harvester position in the field this map indicates a desired position of actuator 212 necessary to deposit an appropriate amount of chopped non-grain plant material on the ground. In one configuration, this map data is derived from one or more soil conditions, such as the amount of nitrogen, phosphorus, or other trace elements in the soil, soil acidity, and amounts of previous herbicide, pesticide, or fertilizer applications. The plant material removal rates may be dictated by any one of these agronomic parameters.

The intelligent control 400 is also coupled to one or more crop sensors 416 which are disposed in combine harvester 100 in a flow path of the cut crop to determine characteristics of the cut crop material.

In one arrangement, a crop sensor 416 is a moisture sensor. The intelligent control 400 is configured to control actuator 212 to vary the amount of chopped non-grain crop material that is deposited on the ground as the crop moisture changes.

In another arrangement a crop sensor 416 is a material quality sensor, such as ethanol conversion potential. The intelligent control 400 is configured to control actuator 212 to increase the amount of chopped non-grain plant material that is deposited on the ground as the crop stover quality decreases.

In another arrangement an operator input device 420 is coupled to the intelligent control 400 to permit the operator to select the type of crop being harvested, such as wheat or corn. The intelligent control 400 is configured to control actuator 212 to vary the amount of chopped non-grain plant material that is deposited on the ground based upon the type of crop that is being harvested.

The intelligent control 400 is also coupled to a material flow rate sensor 418. Depending on the fullness of the crop growth that it harvests, the amount of non-grain plant material may vary significantly. This may require that the system adjusts to the changing flow rate of non-grain plant material by adjusting actuator 212 to maintain constant the amount of non-grain plant material distributed over the ground.

For example, in a parched portion of the field the plants being harvested may be stunted and produce very little non-grain plant material for sending through chopper 118. This will not change the volume of air that is conveyed through chopper 118 and accelerator 126, but it will reduce the density of chopped non-grain plant material entrained in the air—the material flow rate of chopped non-grain plant material through conduit 125, and thus the amount of material deposited on the ground.

To maintain constant the amount of material distributed on the ground, the intelligent control 400 is configured to monitor the mass flow rate of non-grain plant material passing through combine harvester 100 and to control actuator 212 to maintain the material flow rate at the appropriate material flow rate.

For example, the intelligent control 400 is configured to continually determine an appropriate material flow rate to be deposited on the ground based upon the changing signals received from one or all of sensors 406, 408, 412, 416, 418 and the location of the vehicle indicated by map data stored in the memory 414. As the combine harvester travels through the field, the appropriate material flow rate will change. The intelligent control 400 correspondingly changes the position of actuator 212 to maintain this appropriate material flow rate. Similarly, the intelligent control 400 senses when there is a change in the amount of the material entrained in the air and corrects for this as well to maintain the appropriate material flow rate.

Figure 7:
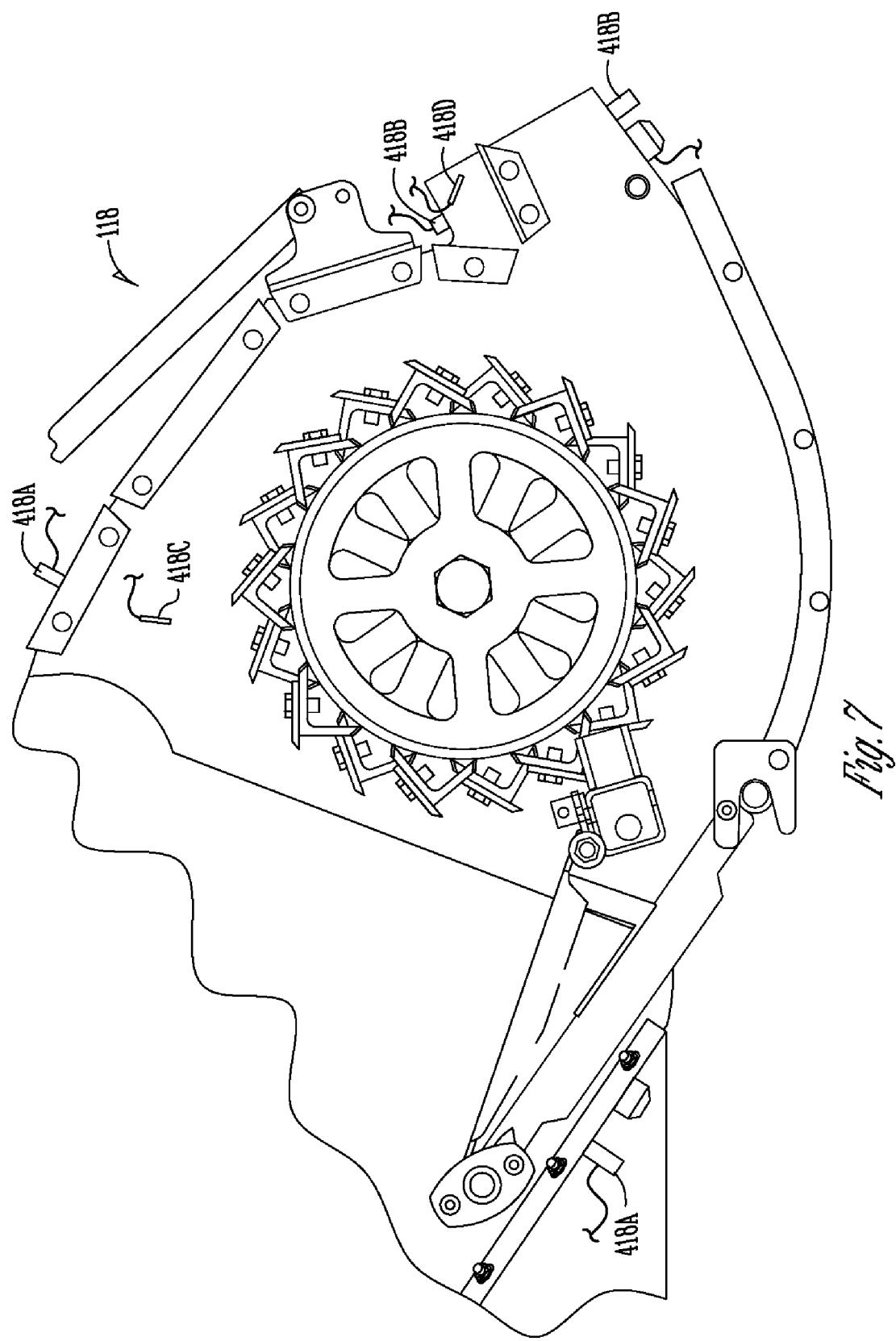
FIG. 7 illustrates placement of sensors on opposite ends of a chopper.

The material flow sensor 418 may be disposed in the flow path of the non-grain plant material upstream of chopper 118. It may also be disposed in a flow path downstream of chopper 118. Referring now to FIG. 7, placement of several different material flow rate sensors is shown. They are identified in FIG. 7 as sensors 418A, 418B, 418C, and 418D.

Material flow rate sensors 418A is an optical flow rate sensor which is configured to transmit light between the two sensor elements across a flow path disposed upstream of the inlet of chopper 118.

An identical optical flow rate sensor may be alternatively disposed downstream of the outlet of chopper 118. It is shown in FIG. 5 as sensor 418B.

Material flow rate sensor 418C is a mass impact flow rate sensor responsive to the impact of non-grain plant material against a striker plate. The greater the material flow rate, the greater the material impacts against sensor 418C, and the greater the signal generated by sensor 418C.

An identical mass impact sensor may be disposed downstream of the outlet of the chopper. It is shown in FIG. 5 as material flow rate sensor 418D. Of course, additional sensors and types of sensors and alternative placements may be used to assist in sensing data which may be used to control the relative amounts of crop residue spread and collected. Additional sensors of any number of types may be placed throughout the combine in any number of locations or configurations to assist in sensing information or data useful in the control or monitoring of the performance of the combine, characterization of grain or grain movement, characterization of non-grain material or non-grain material movement, or for other purposes.

Figure 8:
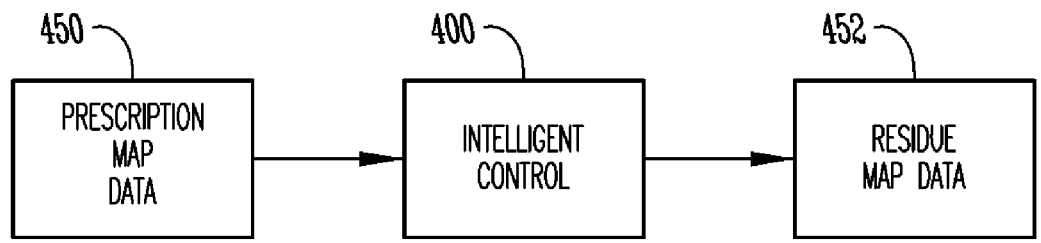
FIG. 8 is a block diagram illustrating the use and creation of map data.

FIG. 8 is a block diagram illustrating information flow. As shown in FIG. 8, prescription map data 450 may be used to provide the intelligent control 400 with instructions regarding control of the spreading and collecting of crop residue. The intelligent control 400 then provides for controlling the spreading and collecting of crop residue at least partially based on the prescription map data 450. The intelligent control 400 may save data regarding its control of the spreading and collecting of crop residue to generate residue map data 452. The residue map data 452 may be the same or different from the prescription map data 452 as prescribed operations may be over-ridden by operator control, or based on feedback from various sensors.

Figure 9:
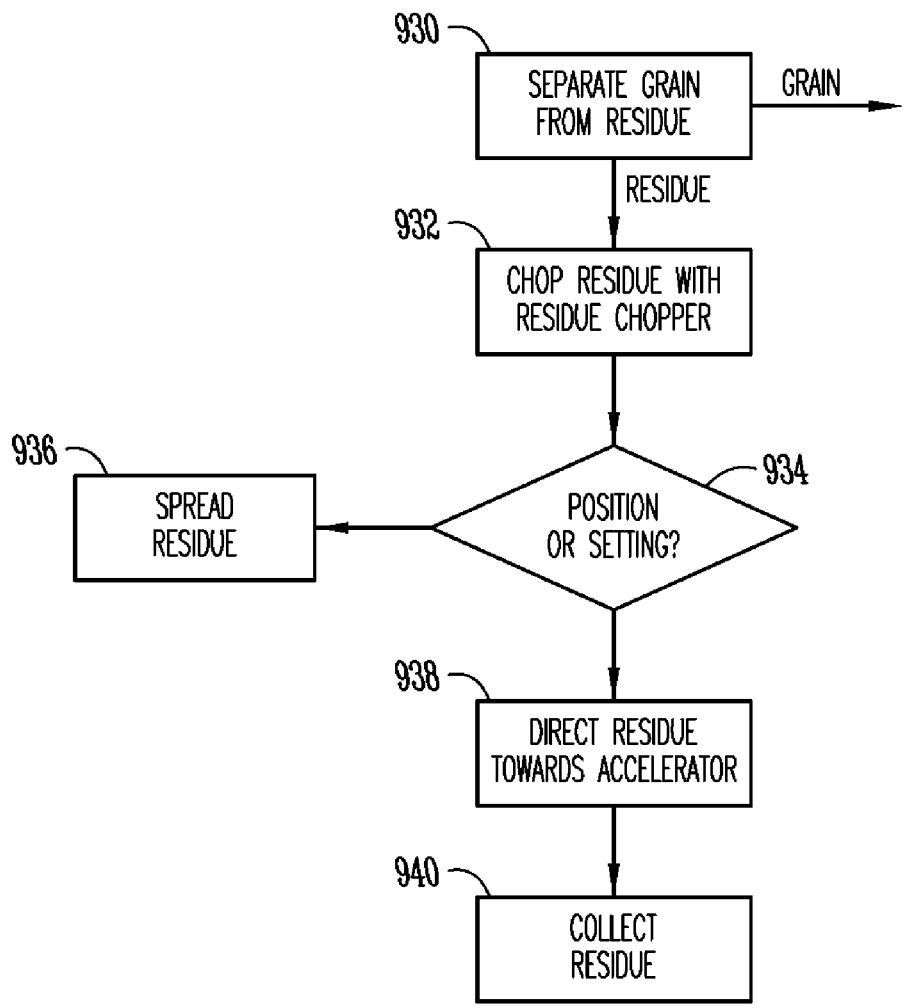
FIG. 9 is a flow diagram illustrating collection and spreading of crop residue.

FIG. 9 is a flow diagram illustrating movement of residue within the harvesting machine such as a combine harvester. In step 930, grain is separated from residue. The grain may be collected in a conventional manner. In step 932, the residue is chopped with a residue chopper. The residue chopper may be of any type or design, including but not limited to a flail chopper. In step 934 alternative paths for the residue are provided depending upon the current configuration or setting. The configuration may be modified in various ways such as by changing position of a lever or electronic control. If the configuration is set to spread residue then in step 936 the residue is spread. Alternatively, if the configuration is set to collect residue then in step 938 residue is directed towards an accelerator. In step 940, the residue is collected. In step 934, the position or setting may direct different amounts or proportions of crop residue towards the accelerator and to be spread. There are any number of positions which allow for varying amounts of crop residue to be spread and collected, thus varying amounts of crop residue may be spread while varying amounts of crop residue are collected during a single pass harvesting operation.

A combination residue spreader and collector for single pass harvesting systems has now been disclosed. It is to be understood that the present invention is not to be limited to the specific embodiments described here as variations in size, form, structure, and features are contemplated. These and other variations, options, and alternatives are within the spirit and scope of the invention.

What is claimed is:

1. A crop residue harvesting system for a harvesting machine having a crop residue chopper, the crop residue harvesting system comprising:
   an accelerator to assist in conveying crop residue up an exit conduit operatively connected to the accelerator;
   a transition member having a first position and a second position;
   wherein in the first position the transition member directs at least a portion of the crop residue to the accelerator and subsequently up the exit conduit and into a collection container for harvesting of the crop residue;
   wherein in the second position the transition member allows for spreading at least a portion of the crop residue onto ground.

2. The crop residue harvesting system of claim 1 wherein the transition member further has at least one intermediate position between the first position and the second position, wherein in the intermediate position the transition member directs a first portion of the crop residue to the accelerator for harvesting of the crop residue and allows a second portion of the crop residue to be spread.

3. The crop residue harvesting system of claim 1 further comprising an actuator operatively connected to the transition member adapted for selecting at least between the first position and the second position.

4. The crop residue harvesting system of claim 1 further comprising an actuator operatively connected before the transition member and adapted for selecting at least between the first position and the second position.

5. The crop residue harvesting system of claim 1 further comprising an actuator operatively connected after the transition member and adapted for selecting at least between the first position and the second position.

6. The crop residue harvesting system of claim 1 wherein in the first position the transition member is above a discharge opening associated with the chopper.

7. The crop residue harvesting system of claim 1 wherein in the second position, the transition member is aligned with a discharge opening associated with the chopper.

8. The crop residue harvesting system of claim 1 wherein position of the transition member is electronically controlled.

9. The crop residue harvesting system of claim 1 wherein the transition member comprises a conduit.

10. The crop residue harvesting system at claim 9 wherein the conduit is pivotably connected proximate the chopper.

11. The crop residue harvesting system of claim 9 wherein the conduit is pivotably connected proximate the accelerator.

12. The crop residue harvesting system of claim 1 further comprising at least one sensor positioned proximate the residue chopper and adapted for sensing at least one characteristic associated with crop residue.

13. A harvesting machine, comprising:
a self-propelled vehicle adapted for separating grain from crop residue;
a residue chopper operatively connected to the vehicle and adapted for receiving the crop residue and chopping the crop residue to form chopped crop residue;
an exit conduit;
an accelerator operatively connected to the exit conduit for conveying the chopped crop residue up the exit conduit;
a transition member having a first position and a second position operatively connected between the residue chopper and the accelerator;
wherein in the first position the transition member directs at least a portion of the chopped crop residue to the accelerator and subsequently through the exit conduit and into a collection container for harvesting of the chopped crop residue;
wherein in the second position the transition member allows for spreading at least a portion of the chopped crop residue onto ground.

14. The crop residue harvesting system of claim 13 wherein the transition member further has at least one intermediate position between the first position and the second position, wherein in the intermediate position, the transition member directs a first portion of the chopped crop residue to the blower for harvesting of the chopped crop residue and allows a second portion of the chopped crop residue to be spread.

15. The harvesting machine of claim 13 further comprising a lever operatively connected to the transition member and further wherein the lever is adapted for selecting between the first position and the second position.

16. The harvesting machine of claim 13 wherein the transition member is electronically controlled.

17. The harvesting machine of claim 13 wherein the residue chopper is a flail chopper.

18. The harvesting machine of claim 13 further comprising an actuator operatively connected proximate the transition member for switching the transition member between two or more positions of the transition members.

19. The harvesting machine of claim 18 further comprising an intelligent control.

20. The crop residue harvesting system of claim 1 further comprising at least one sensor electrically connected to an intelligent control and adapted for sensing at least one characteristic associated with crop residue.

21. The crop residue harvesting system of claim 1 wherein the transition member comprises a conduit.

22. A method for harvesting a crop using a harvesting machine, comprising:
providing the harvesting machine with a crop residue harvesting system comprising:
an accelerator to assist in conveying crop residue up an exit conduit operatively connected to the accelerator;
a transition member having a first position and a second position;
wherein in the first position the transition member directs at least a portion of the crop residue to the accelerator and subsequently up the exit conduit and into a collection container for harvesting of the crop residue;
wherein in the second position the transition member allows for spreading at least a portion of the crop residue onto ground;
selecting a setting on the harvesting machine to control relative proportions of (a) crop residue spreading onto the ground and (b) crop residue harvesting into a collection container;
separating grain from the crop residue using the harvesting machine;
collecting the grain using the harvesting machine;
chopping the crop residue using a chopper of the harvesting machine; and
wherein the step of selecting a setting on the harvesting machine controls the transition member to be positioned at the first position, the second position, or at least one intermediate position between the first position and the second position, corresponding to the relative proportions.

23. The method of claim 22 further comprising the step of conveying at least a portion of the crop residue from the chopper to the accelerator if the setting provides for harvesting the crop residue.

24. The method of claim 22 further comprising the step of spreading at least a portion of the crop residue onto the ground if the setting provides for crop residue spreading.

25. The method of claim 22 wherein the step of selecting is performed by positioning a lever.

26. The method of claim 22 wherein the step of selecting is performed under electronic control.

27. The method of claim 22 wherein the setting provides for crop residue spreading substantially all of the crop residue.

28. The method of claim 22 wherein the setting provides for crop residue harvesting substantially of the crop residue.

29. The method of claim 22 further comprising the step of sensing at least one characteristic of the crop residue.

30. The method of claim 29 wherein the step of selecting a setting is automatically performed at least partially based on the at least one characteristic of the crop residue.

31. The method of claim 29 wherein the step of selecting a setting is automatically performed at least partially based on map data.

32. A crop residue harvesting system for a harvesting machine having a residue chopper, the crop residue harvesting system comprising;
an exit conduit;
an accelerator operatively connected to conduit for crop residue up the exit conduit;
a transition member operatively connected between the residue chopper and the accelerator, wherein a relative position of the transition member to the accelerator or the chopper controls relative amounts of the crop residue (a) conveyed to the accelerator and through the exit conduit for harvest in a collection container and (b) spread to ground;
at least one actuator for adjusting the relative position of the transition member; and an intelligent control operatively connected to the at least one actuator for controlling the relative position of the transition member to thereby control the relative amounts of the crop residue harvested and spread.

33. The crop residue harvesting system of claim 32 further comprising at least one position sensor electrically connected to the intelligent control.

34. The crop residue harvesting system of claim 32 further comprising at least one flow sensor electrically connected to the intelligent control for use in monitoring flow of the chopped crop residue.

35. The crop residue harvesting system of claim 34 wherein the at least one flow sensor is positioned to measure flow of crop residue cut and collected.

36. The crop residue harvesting system of claim 32 further comprising a geolocation sensor operatively connected to the intelligent control wherein the intelligent control is adapted to control the at least one actuator at least partially based on a geolocation associated with the crop residue harvesting system.

37. The crop residue harvesting system of claim 36 wherein the geolocation sensor comprises a GPS receiver.

38. A harvesting machine adapted for selectively collecting and spreading crop residue, comprising:
- a vehicle adapted for separating grain from the crop residue;
- an exit conduit;
- a transition member having at least a first position and a second position;
- wherein in the first position the transition member directs at least a portion of the crop residue towards the exit conduit for collection within a collection container;
- wherein in the second position the transition member allows for spreading at least a portion of the crop residue on ground; and
- at least one actuator operatively connected to the transition member for adjusting position of the transition member.

39. The harvesting machine of claim 38 wherein the transition member has a plurality of intermediate positions between the first position and the second position.

* * * * *

UNITED STATES PATENT AND TRADEMARK OFFICE
CERTIFICATE OF CORRECTION

| | | |
|---|---|---|
| PATENT NO. | : 8,177,610 B2 | Page 1 of 1 |
| APPLICATION NO. | : 12/062846 | |
| DATED | : May 15, 2012 | |
| INVENTOR(S) | : Stuart J. Birrell et al. | |

It is certified that error appears in the above-identified patent and that said Letters Patent is hereby corrected as shown below:

COL. 10, CLAIM 32, LINE 56:
ADD after to --the exit--
ADD after for --conveying chopped--

Signed and Sealed this
Third Day of July, 2012

David J. Kappos
*Director of the United States Patent and Trademark Office*